Patented Jan. 29, 1952

2,583,991

UNITED STATES PATENT OFFICE 2,583,991

HETEROGENEOUS, ACIDIC HYDROLYSIS OF POLYMERIC ESTERS WITH ALKYL PHOSPHORIC ACID ESTERS

Roe C. Blume, Waynesboro, Va., assignor to E. I. du Pont de Nemours & Company, Wilmington, Del., a corporation of Delaware No Drawing. Application September 5, 1947, Serial No. 772,457

19 Claims. (Cl. 260—91.3)

This invention relates to the hydrolysis of polymeric esters and more particularly to the heterogeneous hydrolysis in aqueous, acidic medium of water-insoluble esters of polymeric compounds.

Previously known methods of hydrolyzing water-insoluble polymeric esters have been limited because of certain, inherent disadvantages. For example, the homogeneous hydrolysis of polyvinyl acetate in alcoholic solutions of a sodium alkoxide yields a polyvinyl alcohol of high ash content and a monomeric ester which is normally not readily recoverable for commercial purposes. This latter difficulty is also encountered in the acidic hydrolysis of polyvinyl acetate in its alcoholic solutions. Aqueous hydrolysis of polyvinyl acetate in its acetic acid solutions requires the recovery of large quantities of acetic acid, the amount being usually in the range of 9 to 10 pounds of acetic acid per pound of the polymer produced. Likewise, in the hydrolysis of cellulose triacetate in acetic acid solution, approximately 6.5 pounds of acetic acid must be recovered for each pound of cellulose acetate produced. Hydrolysis of polyvinyl acetate in aqueous hydrochloric acid is an extremely slow reaction. Accordingly, it is economically desirable to hydrolyze polymeric esters in such a way that the acid residue from the polymeric ester is obtained as the free acid or in salt form rather than as a corresponding ester and so that the amount of solvent to be recovered, the amount of catalyst needed, and the total time required are minimized.

This invention has as an object the hydrolysis of water-insoluble, polymeric esters by a process whereby the above-mentioned difficulties are avoided. A further object is the provision of a process for the heterogeneous hydrolysis of water-insoluble polymeric esters. A still further object is the hydrolysis, in aqueous media containing organic acids, of water-insoluble organic esters, such as polyvinyl esters and cellulose esters. Other objects will appear hereinafter.

The objects are accomplished by the following invention in which water-insoluble polymeric esters are hydrolyzed by treating them in aqueous media containing a strong mono- or dialkyl phosphoric acid, the alkyl groups having from three to ten carbon atoms inclusive, the said acid being appreciably soluble in the polymeric ester being hydrolyzed.

The following examples, wherein parts are by weight, are given by way of illustration and are not to be considered as limitative.

EXAMPLE I

To 100 parts of water was added 2 parts of monoisoamyl phosphoric acid ester and thirty parts of a medium viscosity polyvinyl acetate in bead form. The reaction mixture had a pH of 1.5 and a surface tension of about 29 dynes per centimeter. After stirring the initially heterogeneous reaction mixture for 14 hours at 90° C. to 95° C., a clear solution was obtained, indicating the production of a water-soluble polyvinyl alcohol. The product could be isolated in powder form by any of the usual methods, such as precipitation. Alternatively, the acids could be destroyed by addition of a base and the water could be removed by distillation, leaving a solid product which could be further purified readily by washing techniques. The dried product, having a degree of hydrolysis of about 95%, was found to be readily dispersible in water.

EXAMPLE II

Thirty parts of a medium viscosity polyvinyl acetate, 100 parts of water, and 4 parts of monobutyl phosphoric acid ester were heated with stirring at 95° C. The pH of the reaction mixture was 1.7 and its surface tension was 40 dynes per centimeter. After 12 hours of heating a homogeneous solution resulted, the product being a water-dispersible polyvinyl alcohol and the degree of hydrolysis being more than 75%.

EXAMPLE III

A reaction mixture was made up composed of the following ingredients: 30 parts of cellulose triacetate, 100 parts of water and 2 parts of monoisoamyl phosphoric acid ester. After heating with stirring for 22 hours at 90° C. to 95° C., a secondary cellulose acetate was obtained which contained 45.1% combined acetic acid, as compared to 62.5% combined acetic acid in the starting material. In a similar run but using 1 part of sulfuric acid in place of the acid ester, the cellulose triacetate was hydrolyzed only to a slight degree, the ester containing 58.25% combined acetic acid.

EXAMPLE IV

A reaction mixture was prepared containing 20 parts of polymethylacrylate, 100 parts of water and 5 parts of monoisoamyl phosphoric acid ester. Heating at 90° C. to 95° C. with stirring for 20 hours led to a sodium bicarbonate soluble polyacrylic acid.

EXAMPLE V

A series of experiments were performed as follows:

Thirty parts of polyvinyl acetate was added to 100 parts of water. The alkyl orthophosphoric acid ester being tested was then added in the amounts indicated in Table I below. The reaction mixture was then heated with stirring at 90°

C. to 95° C. The time indicated is that required to obtain water-soluble products (at least 75% hydrolysis). "No reaction" indicates that the polymer beads were not swollen and/or no acetic acid could be detected in the hydrolysis medium. The pH and surface tension measurements (dynes per centimeter) were made on 1% solutions of the acid ester in distilled water (25° C.). These pH values corresponded closely to those for the polymer containing reaction media.

Table I

| Catalyst | Parts | Time (Hrs.) | | Surface Tension | pH |
|---|---|---|---|---|---|
| Monomethyl phosphoric acid | 4 | 24 | No reaction | 65 | 1.4 |
|  |  | 48 | Solution |  |  |
| Monoethyl phosphoric acid | 4 | 24 | Part reaction | 65 | 1.4 |
|  |  | 40 | Solution |  |  |
| Mono-n-propyl phosphoric acid | 4 | 18 | do | 56 | 1.4 |
| Monobutyl phosphoric acid (Ex. II) | 4 | 12 | do | 40 | 1.7 |
| Monoisoamylphosphoric acid | 2 | 13 | do | 29 | 1.5 |
| Mono-n-octyl phosphoric acid | 2 | 16 | do | 23 | 1.7 |
| Mono-2-ethylhexyl phosphoric acid | 2 | 16 | do |  |  |
| Monodecyl phosphoric acid | 2 | 16 | do |  |  |
| Di-2-ethylhexyl phosphoric acid | 2 | 22 | do |  |  |
| Didecyl phosphoric acid | 2 | 32 | do |  |  |
| Monolauryl phosphoric acid | 2 | 16 | No reaction | 27 | 2.5 |
| Dilauryl phosphoric acid | 2 | 24 | do | 32 | 3.1 |
| Monocetyl phosphoric acid | 2 | 24 | do | 34 | 2.5 |
| Dicetyl phosphoric acid | 2 | 24 | do |  |  |
| Di-n-octadecyl phosphoric acid | 2 | 48 | do |  |  |

From the above table it can be seen that those alkyl phosphoric acids having alkyl chains of three to ten carbon atoms inclusive are effective hydrolysis catalysts. In the absence of the catalysts such as employed in this invention little or no hydrolysis occurs. Likewise, as shown in the table, when the catalyst used is an alkyl phosphoric acid in which the alkyl groups are less than three or more than ten carbon atoms in length hydrolysis occurs only very slowly if at all under the conditions described. However, under these conditions hydrolysis of the polymeric esters may be carried to 75% completion or more in as little as 12 hours with the catalysts of this invention, namely, those alkyl phosphoric acids having alkyl chains of three to ten carbon atoms.

In the heterogeneous hydrolysis of water insoluble polymeric esters by the process of this invention it is necessary that the catalysts used be appreciably soluble in the polymeric esters subjected to hydrolysis, and sufficiently acidic to promote the desired hydrolysis. The acid should not, however, be completely ionized, since the water-insoluble polymeric esters are not readily permeated by ions. Satisfactory results are obtained using alkyl phosphoric acid esters in which the alkyl groups contain from 3 to 10 carbon atoms. The acids usually produce hydrolysis media having pH's of less than 2.0 and surface tensions of less than 60 dynes per centimeter. Generally, the surface tension is indicative of the relative solubility of the catalyst acid in water and in the polymer. The lower the surface tension imparted to the hydrolysis solution by the catalyst acid the more favorable is the partition between more polar and less polar phases. As indicated in Table I, surface tensions and pH values can be used as determinants of utility. For example, the solution of monolauryl phosphoric acid has a pH of 2.5 and surface tension of 27 dynes/cm., yet no hydrolysis of the polyvinyl acetate had occurred using this solution after 16 hours. It and similar acids are too weakly acidic. On the other hand, 95% hydrolysis is obtained in only about 14 hours using a similar solution of monoisoamyl phosphoric acid which solution has a surface tension of 29 dynes/cm. and a pH of 1.5. This acid has the requisite solubility and acidity. Monomethyl- and monoethyl phosphoric acids are examples of acids lacking the required solubility.

Any phosphoric acid ester having the requisite solubility and acidity may be used in the process of this invention. In general, any mono- or di-ester of orthophosphoric acid having alkyl chains three to ten carbon atoms in length will effectively catalyze the hydrolysis of water-insoluble polymeric esters. Such acids are sufficiently soluble in the particular polymeric esters, sufficiently acidic and are not decomposed under the conditions of the hydrolysis. Effectiveness is comparatively low outside this group; acid esters not in the group lack either or both the required solubility and acidity. In addition to the effective catalysts described in the above examples the following compounds are useful in the process of this invention: monoisopropyl phosphoric acid, di-n-propyl phosphoric acid, di-n-butylphosphoric acid, mono-n-amylphosphoric acid, di-isoamylphosphoric acid, mono-n-hexylphosphoric acid and di-n-octylphosphoric acid.

The alkali metal or alkaline earth metal salts of any of these acid esters may be used in combination with a still stronger organic or inorganic acid. Likewise, any derivatives of the acids which are readily convertible to the active acids may be employed advantageously. Thus, it is also possible to employ trialkyl esters of orthophosphoric acid which contain at least one ester group which is stable to hydrolysis under the conditions employed and at least one ester group which is readily hydrolyzed.

The amount of acid catalyst is not critical. Satisfactory hydrolysis proceeds under the process of this invention with concentrations of as little as 1% based on the polymer weight. Concentrations preferred are in the range of 2% to 10% of the catalysts, either in the acid esters or salt form. Larger amounts may be employed; however, since the reaction is catalytic, advantage of the effectiveness of small amounts is usually taken.

Likewise, the temperature is not critical. In most cases the hydrolysis of polyvinyl acetate in the presence of the phosphoric acid esters of this invention is carried out at 90° C. to 100° C. This range is preferred, for in most cases rapid hydrolysis is attained at these temperature levels without injurious effect on the polymers. Lower temperatures, such as 0° C. to 90° C., may be employed, however, if desired. On the other hand, the rate of hydrolysis may be increased by employing higher temperatures, such as 100°

C. to 150° C., obtainable by well-known methods. However, relatively complicated apparatus is required at these temperatures and the risk of degrading the various polymers is substantial. For most purposes, the temperature range of 90° C. to 100° C. is satisfactory.

The time of hydrolysis will, of course, vary with the degree of hydrolysis desired, the temperature, the concentration of acids and the particular acids and particular polymers employed. In general, the reaction time will be 5 to 40 hours, although longer or shorter times can be used. As usually employed the hydrolysis reaction of this invention is continued until useful products are obtained, as, for example, water-soluble polyvinyl alcohols and acetone-soluble cellulose acetate. Hydrolysis, however, may be terminated at any point prior to this, if desired.

While the invention has been described with particular reference to the hydrolysis of polyvinyl acetate and cellulose triacetate, other esters may be advantageously hydrolyzed by the process of this invention. For example, polyvinyl formate, simple or mixed esters of cellulose, such as cellulose formate, cellulose propionate, cellulose acetate propionate and cellulose acetate butyrate, starch acetate, and esters of polymeric acids such as polymethylacrylate may be hydrolyzed readily by the process of this invention. Interpolymers of vinyl acetate and other polymerizable monomers, such as ethylene/vinyl acetate and vinyl chloride/vinyl acetate copolymers are also hydrolyzable by means of this invention. So also are copolymers of vinyl chloride and diethyl fumarate.

In the hydrolysis of polyvinyl acetate and other polymer esters by the process of this invention, the beads of the polymer actually grow in size in the initial stages of the reaction. As hydrolysis proceeds, the number of hydroxyl groups on the chain increases with attendant water-solubility. In this acidic hydrolysis, the following steps are postulated:

1. Ionization of the acid catalyst occurs according to the equilibrium: $H^+ + A^- \rightleftharpoons HA$, where $A^-$ is an anion of the higher molecular weight acid ester, $H^+$ represents a hydrogen ion and HA is the catalyst in molecular form.
2. Molecules of water and acid catalyst, HA, dissolve in the polymer.
3. Ionization of these molecules occurs within the polymer bead and hydrolysis proceeds to equilibrium with swelling of the polymer bead, for example: $HA \rightleftharpoons H^+ + A^-$

4. Finally, the bead disappears when hydrolysis has produced a polymer soluble in the reaction medium.

From the above postulates it is apparent that the catalyst must be reasonably soluble in the polymer, such as polyvinyl acetate and, also it must be a strong acid in order to promote hydrolysis. However, it is desirable that the catalyst be not completely ionized, for as pointed out above, the water-insoluble polymeric esters are not readily permeated by ions. Any substantially completely ionized acid, which may be an organic, such as oxalic acid or a mineral acid such as sulfuric acid, may be used to increase the concentration of HA, thereby effecting an increase in the concentration of HA molecules in the polymer beads. In most instances, the catalysts of this invention are effective in the absence of these acids. For example, at catalyst concentrations of about one to two percent, the addition of mineral or other strong acids has very little effect, whereas at low concentrations of the catalyst acid (about 0.02%, for example) the rate of reaction is markedly increased.

Hydrolysis does not occur at an appreciable rate if mineral acids are used alone. For example, after heating polyvinyl acetate with 2% hydrochloric acid for 56 hours with stirring little or no change occurred in the polymer beads and a homogeneous solution of polyvinyl alcohol was not obtained. Likewise, sulfuric acid alone did not promote hydrolysis at a reasonable rate. This is true also of the organic auxiliary acids, such as oxalic acid, which do not have the requisite solubility.

The catalysts to be effective must be resistant to aqueous hydrolysis. For example, when 30 parts of polyvinyl acetate, 100 parts of water and 2 parts of 2-ethylhexyl sulfuric acid ester were heated with stirring at 90° C. to 95° C. for 48 hours, no change in the polymer beads was noted. The catalyst employed was not sufficiently stable and was completely hydrolyzed before it had penetrated the polymer structure sufficiently to catalyze the hydrolysis of the polymeric ester. Sulfuric acid esters of aliphatic alcohols, although they are strong acids and are soluble in the polyvinyl acetate, are ineffective because of their rapid decomposition in water. Likewise, if all the ester groups in a particular orthophosphoric acid ester are rapidly hydrolyzed, the said ester is not operable in this invention.

As described in copending application, Goebel, Serial No. 742,466, filed April 18, 1947 in acidic media anionic catalysts are needed, cationic catalysts being ineffective. For example, no hydrolysis occurs when a cationic catalyst, such as cetyl-dimethyl benzyl ammonium chloride (1 part), is used in the hydrolysis of polyvinyl acetate (60 parts) carried out in water (100 parts) containing concentrated sulfuric acid (1 part), the temperature being 90° C. to 95° C. for 120 hours. In dyeing experiments it was shown that in acid solution only a dye having a colored anion was absorbed by the polymer, whereas, in basic solution only a dye having a colored cation was taken up by the polymer. It was also found that the acid hydrolysis could be catalyzed by the use of an anionic dye, sodium hydroxy azobenzene sulfonate (Orange II) in the presence of sulfuric acid. This particular agent has too little effect on the surface tension of water to be classed as a wetting agent. For example, 1% aqueous solutions of Orange II have surface tensions of about 50 dynes per centimeter, whereas, a 1% aqueous solution of the sodium salt of dodecylbenzene sulfonic acid, a typical wetting agent, has a surface tension of 33 dynes per centimeter. Similarly, benzene phosphonic acid, an effective catalyst, can not be classed as a wetting agent, its 1% aqueous solution being characterized by a surface tension of 50 dynes per centimeter. Thus, while certain of the effective catalysts such as dodecylbenzene sulfonic acid, do have good wetting action, this characteristic is not required. This has also been found to be true of the acid esters of this invention, some of the phosphoric acid esters being good wetting agents and others not having this property.

Hitherto, formation of an emulsion has been considered to be an essential part of the hydrolysis of esters, such as glycerides or polyvinyl esters. Hydrolysis at a reasonable rate was thought impossible in the absence of wetting agents and their action. Accordingly, solvents were used and the medium was especially prepared so that the ester being hydrolyzed was present in a dispersed liquid phase. In this invention, the ester is present in a solid phase. It is not necessary in the process of this invention to prepare special emulsions nor to recover solvents to make the process economically feasible. No solvents need be used in the process of this invention and recovery steps are limited to the reclamation of the acid freed from the polymeric ester in the hydrolysis.

In this respect the process of this invention has outstanding advantages over previously known acidic hydrolysis methods. As pointed out above, aqueous hydrolysis of polyvinyl acetate in its acetic acid solutions requires recovery of about 9 to 10 pounds of acetic acid per pound of polyvinyl alcohol produced. Similar hydrolysis of cellulose acetate requires recovery of about 6.5 pounds of acetic acid per pound of cellulose acetate. These polymers may be hydrolyzed efficiently and to the same degree as formerly by the process of this invention. Further, only about 1.35 pounds of acetic acid per pound of polyvinyl alcohol and only 0.18 pound of acetic acid per pound of acetone-soluble cellulose acetate produced require recovery. Considerable economic advantage of the process of this invention is apparent from a comparison of these figures to the respective figures given for the old processes.

The process of this invention may be used advantageously in the hydrolysis of any water-insoluble polymeric ester. Unlike prior processes, excessive amounts of acid or solvent are not consumed. There are no problematical recovery steps. No solvents are used and recovery steps are, therefore, minimized. Further, the acid obtained from the polymeric ester is recovered readily as the free acid, formation of troublesome esters being avoided. The efficiency of the catalysts permits their use in small, inexpensive amounts and also the accomplishment of the desired hydrolysis in relatively short periods of time. The products of this invention may be used in film and fiber form and, in general, wherever the polymers, for example, polyvinyl alcohol and cellulose acetate, find application.

Any departure from the above description which conform to the present invention is intended to be included within the scope of the claims.

I claim:

1. A process comprising the heterogeneous hydrolysis of water-insoluble polymeric carboxylic acid esters in aqueous media containing a strong orthophosphoric acid ester selected from the group consisting of mono- and dialkyl orthophosphoric acid esters the alkyl groups of which have from three to ten carbon atoms, these said acid esters being appreciably soluble in the said polymeric esters in the presence of water.

2. The process in claim 1 wherein the said water-insoluble polymeric ester is a polyvinyl ester.

3. The process in claim 1 wherein the said water-insoluble polymeric ester is polyvinyl acetate.

4. The process in claim 1 wherein the said water-insoluble polymeric esters are cellulose esters.

5. The process in claim 1 wherein the said water-insoluble polymeric ester is cellulose acetate.

6. A process comprising the heterogeneous hydrolysis of water-insoluble polymeric carboxylic acid esters in aqueous media containing a strong mineral acid and a strong orthophosphoric acid ester selected from the group consisting of mono- and dialkyl orthophosphoric acid esters the alkyl groups of which have from three to ten carbon atoms, the said acid ester being appreciably soluble in the said polymeric esters in the presence of water.

7. A process comprising forming a heterogeneous mixture by mixing a water-insoluble polymeric carboxylic acid ester with an aqueous medium containing a strong orthophosphoric acid ester selected from the group consisting of mono- and dialkyl phosphoric acid esters, which ester is appreciably soluble in said polymeric carboxylic acid ester in the presence of water and the alkyl groups of which have from three to ten carbon atoms and then subjecting the said ester to hydrolysis in the said heterogeneous mixture.

8. A process in accordance with claim 7 in which the said aqueous medium contains a strong mineral acid.

9. A process in accordance with claim 7 in which the said heterogeneous mixture is heated to a temperature of 90° C. to 100° C.

10. A process in accordance with claim 7 in which said polymeric ester is polyvinyl acetate.

11. A process in accordance with claim 7 in which said heterogeneous mixture has an initial pH of less than 2.

12. A process in accordance with claim 7 in which the said phosphoric acid ester is monoisoamyl phosphoric acid ester.

13. A process in accordance with claim 7 in which the said phosphoric acid ester is monobutyl phosphoric acid ester.

14. A process in accordance with claim 7 in which the said heterogeneous mixture has an initial pH of less than 2 and a surface tension of less than 60 dynes per centimeter.

15. A process in accordance with claim 7 in which the said heterogeneous mixture contains from 2% to 10% of the said phosphoric acid ester.

16. A process comprising forming a heterogeneous mixture by mixing polyvinyl acetate with an aqueous medium containing monoisoamyl orthophosphoric acid, the said mixture having a pH of 1.5 and a surface tension of about 29 dynes per centimeter; and then subjecting said polyvinyl acetate to hydrolysis in the said heterogeneous mixture by heating said mixture to a temperature of 90° C. to 95° C.

17. The process in accordance with claim 7 wherein the said water-insoluble ester is a polyvinyl ester.

18. The process in accordance with claim 7 wherein the said water-insoluble esters are cellulose esters.

19. The process in accordance with claim 7 wherein the said water-insoluble ester is cellulose acetate.

ROE C. BLUME.

REFERENCES CITED

The following references are of record in the file of this patent:

UNITED STATES PATENTS

| Number | Name | Date |
|---|---|---|
| 2,121,899 | Auden et al. | June 28, 1938 |